US008145685B2

(12) United States Patent
Thompson et al.

(10) Patent No.: US 8,145,685 B2
(45) Date of Patent: Mar. 27, 2012

(54) OBJECT RELATIONAL MAPPING LAYER

(75) Inventors: David Thompson, San Francisco, CA (US); Oleg Nickolayev, Redwood Shores, CA (US); Yogeshwar Wamanrao Kuntawar, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 534 days.

(21) Appl. No.: 12/192,898

(22) Filed: Aug. 15, 2008

(65) Prior Publication Data
US 2009/0024652 A1    Jan. 22, 2009

Related U.S. Application Data

(63) Continuation of application No. 10/684,055, filed on Oct. 10, 2003, now Pat. No. 7,599,948.

(51) Int. Cl.
G06F 17/30 (2006.01)
(52) U.S. Cl. .................. 707/804; 707/805; 707/807
(58) Field of Classification Search .......... 707/804, 707/805, 807
See application file for complete search history.

(56) References Cited

U.S. PATENT DOCUMENTS

| 5,226,158 | A | 7/1993 | Horn et al. |
| 5,303,147 | A | 4/1994 | Oba et al. |
| 5,806,064 | A | 9/1998 | Garza |
| 5,857,197 | A | 1/1999 | Mullins |
| 5,937,409 | A | 8/1999 | Wetherbee |
| 6,163,776 | A | 12/2000 | Periwal |
| 6,711,582 | B2 | 3/2004 | Xu et al. |
| 6,728,727 | B2* | 4/2004 | Komine et al. ............ 1/1 |
| 6,907,433 | B2 | 6/2005 | Wang et al. |
| 6,996,566 | B1* | 2/2006 | George et al. ............ 1/1 |
| 2001/0050675 | A1* | 12/2001 | O'Leary ............ 345/169 |
| 2001/0051948 | A1 | 12/2001 | Srinivasan et al. |
| 2003/0206170 | A1 | 11/2003 | Bickmore et al. |
| 2003/0236787 | A1 | 12/2003 | Burges |
| 2004/0015814 | A1* | 1/2004 | Trappen et al. ........ 717/100 |
| 2005/0055363 | A1 | 3/2005 | Mather |
| 2005/0097187 | A1 | 5/2005 | Thompson et al. |
| 2007/0136385 | A1 | 6/2007 | Abrashkevich et al. |

OTHER PUBLICATIONS

Pugh (Pugh, "Skip Lists: A Probabilistic Alternative to Balanced Trees", Communications of ACM, vol. 33 No. 6, p. 668-676 [online], Jun. 1990. Retrieved from the Internet:< http://portal.acm.org/citation.cfm?id=78977&dI=GUIDE>).*

(Continued)

Primary Examiner — Jean B Fleurantin
Assistant Examiner — Dennis Myint
(74) Attorney, Agent, or Firm — Kilpatrick Townsend & Stockton LLP

(57) ABSTRACT

An integration server system for mapping data objects on a database schema offers a strongly-typed model API, complex constraint management, and association balancing. The integration server system also has improved performance through optimized handling of ordered associations of data object and of string-valued attributes. The integration server system comprises a database schema configured to store a set of data object instances. A metadata model represents a configuration of the set of data object instances in the database schema. A model application programming interface provides a client application with access to the set of data object instances, and a metadata application programming interface provides a client application with access to the set of data object instances via the metadata model.

58 Claims, 8 Drawing Sheets

OTHER PUBLICATIONS

Pugh; "Skip Lists: A Probabilistic Alternative to Balanced Tress"; 1990, Communications of ACM, vol. 33, No. 6, pp. 668-676, Retrieved from the Internet:http://portal.acm.org/citation.cfm?id=78977&di=GUIDE.

Copeland, George P., et. al., "String Storage and Searching for Database Applications: Implementation on the INDY Backend Kernel", ACM Computer Architecture News, vol. 7 No. 2. p. 8-17 [online] 1978. Retrieved from the Internet:<URL: http://portal.acm.org/ft_gateway.cfm?id=983002&type=pdf&coll=GUIDE&dl=GUIDE&CFID=34580883&CFTOKEN=25224032>.

Batory, D.S., "Modeling the Storage Architectures of Commercial Database Systems", ACM Transactions on Database System vol. 10, No. 4, pp. 463-528 [online] Dec. 1985. Retrieved from the Internet: <URL: http://portal.acm.org/ft_gateway.cfm?id=5392&type=pdf&coll=GUIDE&dl=GUIDE&CFID=34581698&CFTOKEN=41576145>.

U.S. Appl. No. 60/051,108, Periwal.

Bahekar, Prajakta et al.; "Remodeling .NET Pet Shop with NJDX: A Project Report"; 2006, Software Tree, Inc., 16 pages.

Joshi, Smita; "JFLIX™ Movie Rental Application: A Technical Overview"; 2007, Software Tree, Inc., 22 pages.

Periwal, Damodar; The KISS (Keep It Simple and Straightforward) Principles for OR-Mapping Products from Software Tree, Inc., 2005, Software Tree, Inc., 7 pages.

Raju, Rajini et al.; "Porting Java Pet Store Application Using JDX OR-Mapper Persistence"; 2004, Software Tree, Inc., 27 pages.

"Beyond JDBC™: Some of the issues to consider while using raw JDBC"; 2002, www.softwaretree.com, 2 pages.

"Simplifying Data Integration—Linking Java™ Objects to Relational Databases: Technology White Paper"; 1997, www.softwaretree.com, 6 pages.

"NJDX™: *Beyond* ADO.net: Some of the issues to consider while using raw ADO.net"; 1997, www.softwaretree.com, 2 pages.

"NJDX 1.5 Net Jet Database Exchange: User Manual"; 1997, www.softwaretree.com, 13 pages.

Batory, D.S.; "Modelling the Storage Architectures of Commercial Database Systems"; 1985, ACM Transactions on Database Systems, vol. 10, No. 4.

Notice of Allowance of Jun. 2, 2009 for U.S. Appl. No. 10/684,055; 14 pages.

Non-Final Office Action of Nov. 28, 2008 for U.S. Appl. No. 10/684,055; 30 pages.

Office Communication, Advisory Action of May 16, 2008 for U.S. Appl. No. 10/684,055; 3 pages.

Office Communication, Interview Summary of May 5, 2008 for U.S. Appl. No. 10/684,055; 4 pages.

Final Office Action of Mar. 24, 2008 for U.S. Appl. No. 10/684,055; 28 pages.

Non-Final Office Action of Aug. 9, 2007 for U.S. Appl. No. 10/684,055; 32 pages.

\* cited by examiner

| ID | NAME |
|---|---|
| 1 | MAP 1 |
| 2 | MAP 2 |

305

300

| ID | MAP_ID | MAP_SEQ | RULE |
|---|---|---|---|
| 1 | 1 | 10 | CAT |
| 2 | 1 | 20 | ADD |
| 3 | 1 | 30 | COPY |
| 4 | 2 | 10 | COPY |
| 5 | 1 | 25.8 | NEW RULE |

| ID | NAME | ADDRESS | |
|---|---|---|---|
| | | STRING | LARGE STRING |
| 1 | GROUCHO | | LONG ADDRESS ... |
| 2 | HARPO | ADDRESS | |
| 3 | CHICO | ADDRESS | |
| 4 | ZEPPO | | LONG ADDRESS ... |

FIG. 4

OBJECT RELATIONAL MAPPING LAYER

CROSS-REFERENCES TO RELATED APPLICATIONS

This application is a continuation of U.S. patent application Ser. No. 10/684,055, entitled "Object Relational Mapping Layer," filed Oct. 10, 2003, which is hereby incorporated herein by reference for all purposes.

BACKGROUND OF THE INVENTION

A wide variety of software applications need to create, modify, store, and analyze large quantities of data. Relational database management systems are ideally suited towards this need, providing the resources needed to handle large quantities of data. However, many typical software applications handle data in the form of data objects and it is difficult for these applications to manipulate data in databases directly. In contrast, relational database management systems often cannot operate on data objects directly.

To address this difficulty, object relational mapping tools translate data stored in a database into data objects to be manipulated by software applications. Object relational mapping tools hide the complexity of the underlying database from the end application. However, these object relational mapping tools do not provide full object management features and integration with the database. Further, the performance of prior object relational mapping tools is limited and allows for errors to be introduced by applications.

It is desirable to have an integration server system with object relational mapping tools that provides a strongly-typed model application programming interface, complex constraint management, and association balancing. The system also has improved performance through optimized handling of ordered associations of data object and of string-valued attributes.

BRIEF SUMMARY OF THE INVENTION

An embodiment of an integration server system for mapping data objects on a database schema offers a strongly-typed model API, complex constraint management, and association balancing. This embodiment of the system also has improved performance through optimized handling of ordered associations of data object and of string-valued attributes.

In one embodiment, the integration server system comprises a database schema configured to store a set of data object instances. A metadata model represents a configuration of the set of data object instances in the database schema. A model application programming interface provides a client application with access to the set of data object instances, and a metadata application programming interface provides a client application with access to the set of data object instances via the metadata model.

In a further embodiment, the database schema includes a table having a plurality of rows and columns to store the set of data object instances and the metadata model includes a representation of the table. In yet a further embodiment, the model application programming interface accesses the set of data object instances via the metadata application programming interface.

In another embodiment, the database schema includes a sequence attribute to preserve an ordered association between the set of data object instances, such that an intermediate sequence attribute instance has a random value between a pair of values of a pair of adjacent sequence attribute instances. In a further embodiment, the intermediate sequence attribute instance has a floating point value.

In yet another embodiment, the database schema alternately stores an instance of a string-valued attribute of the set of data object in a first data-type or a second data-type in response to the length of the instance of the string-valued attribute. The first data-type is a fixed-length data structure and has a predetermined size. The first data-type stores the instance of the string-valued attribute in response to the instance of the string-valued attribute having a length less than the predetermined size. Alternatively, the second data-type is a variable length data structure that stores the instance of the string-valued attribute in response to the instance of the string-valued attribute having a length greater than the predetermined size.

In a further embodiment, the model application programming interface receives the instance of the string-valued attribute from a client program, determines the length of the instance of the string-valued attribute, and directs the instance of the string-valued attribute to either the first data-type or the second data-type in response to the length of the instance of the string-valued attribute. In still a further embodiment, the first data-type is associated with a first column of a table of the database schema, and the second data-type is associated with a second column of the table of the database schema.

In an additional embodiment, the database schema includes a database constraint adapted to ensure that the set of data object instances include a set of valid attribute values. A class type attribute identifies each of the set of data object instances as a member of at least one of a plurality of classes, and the database constraint is conditioned on the value of the class type attribute. An examples of database constraints includes a "not null" constraint.

In yet another embodiment of the invention, the model application programming interface includes an association balance method adapted to balance an association attribute of the set of data object instances.

A further embodiment of the invention includes a generator to create the database schema in response to a model description. The generator may also create a database constraint to ensure that the set of data object instances include a set of valid attribute values. Furthermore, the generator may create a fixed-length data structure having a predetermined size and a variable length data structure adapted to alternately store an instance of a string-valued attribute. In one example implementation, the model description defines a data object hierarchy using the unified modeling language. In another embodiment of the invention, the generator creates a definition of a data object in the database schema.

BRIEF DESCRIPTION OF THE DRAWINGS

The invention is described with reference to the drawings, in which:

FIG. 3 is an example database schema illustrating an optimized insertion sequence according to an embodiment of the invention;

FIG. 4 is an example database schema illustrating an optimized string storage according to an embodiment of the invention;

DETAILED DESCRIPTION OF THE INVENTION

Figure 1:
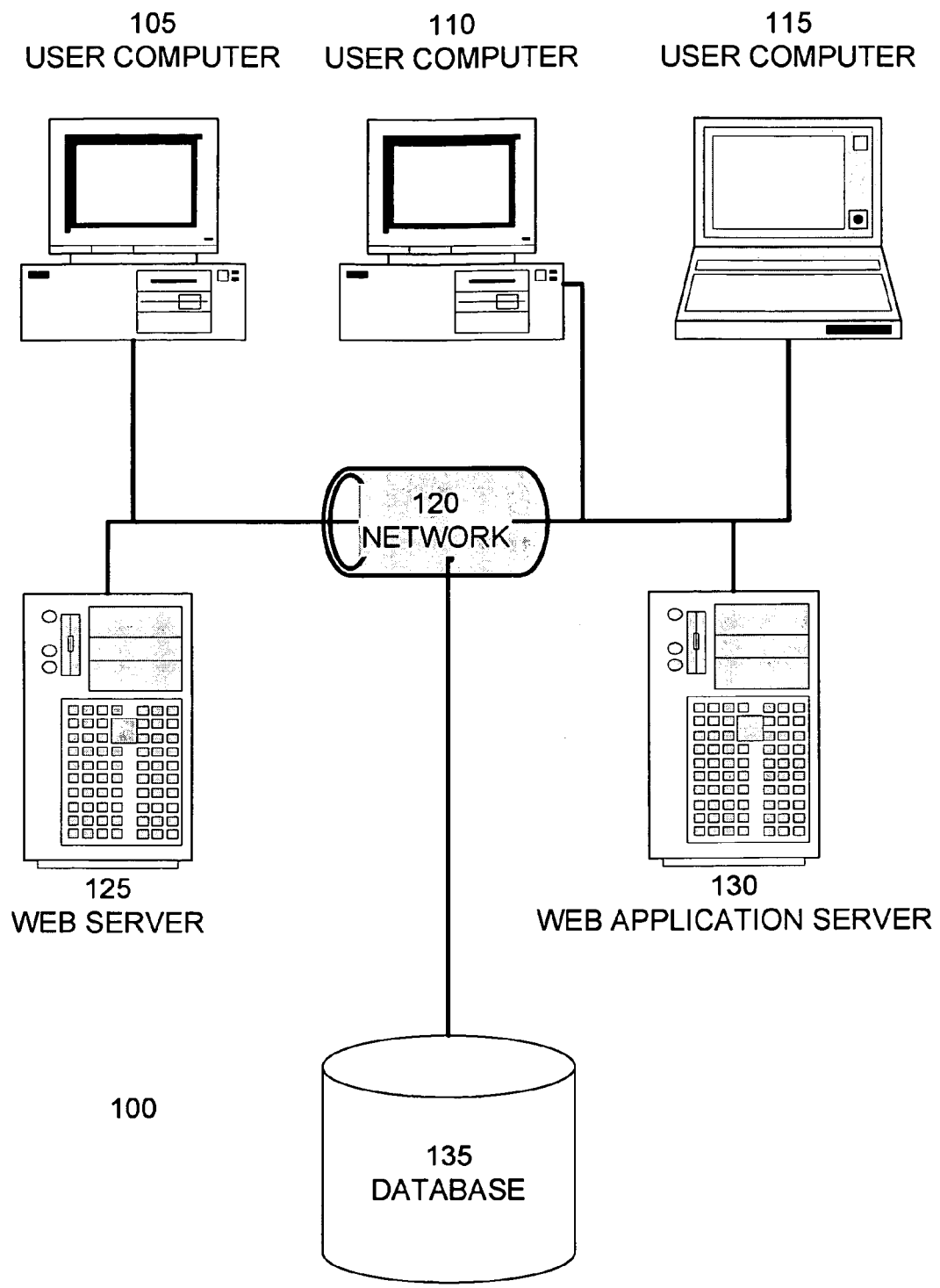
FIG. 1 is a block diagram of a system for implementing an embodiment of the invention.

FIG. 1 is a block diagram of a system 100 for implementing an embodiment of the invention. System 100 includes user computers 105, 110, and 115. User computers 105, 110, and 115 can be general purpose personal computers having web browser applications. Alternatively, user computers 105, 110, and 115 can be any other electronic device, such as a thin-client computer, Internet-enabled mobile telephone, or personal digital assistant, capable of displaying and navigating web pages or other types of electronic documents. Although system 100 is shown with three user computers, any number of user computers can be supported.

A web server 125 is used to process requests for web pages or other electronic documents from user computers 105, 110, and 115. In an embodiment of the invention, the data analysis software operates within a web browser on a user computer. In this embodiment, all user interaction with the data analysis software is via web pages sent to user computers via the web server 125.

Web application server 130 operates the data analysis software. In an embodiment, the web application server 130 is one or more general purpose computers capable of executing programs or scripts in response to the user computers 105, 110 and 115. The web application can be implemented as one or more scripts or programs written in any programming language, such as Java™, C, or C++, or any scripting language, such as Perl, Python, or TCL.

In an embodiment, the web application server 130 dynamically creates web pages for displaying the data analysis software. The web pages created by the web application server 130 are forwarded to the user computers via web server 125. Similarly, web server 125 receives web page requests and input data from the user computers 105, 110 and 115, and forwards the web page requests and input data to web application server 130.

The data analysis application on web application server 130 processes input data and user computer requests and can be stored or retrieved data from database 135. Database 135 stores data created and used by the enterprise. In an embodiment, the database 135 is a relational database, such as Oracle 9i, that is adapted to store, update, and retrieve data in response to SQL format commands.

An electronic communication network 120 enables communication between computers 105, 110, and 115, web server 125, web application server 130, and database 135. In an embodiment, network 120 may further include any form of electrical or optical communication devices, including wireless and wired networks. Network 130 may also incorporate one or more local-area networks, such as an Ethernet network; wide-area networks, such as the Internet; and virtual networks, such as a virtual private network.

The system 100 is one example for executing a data analysis software according to an embodiment of the invention. In another embodiment, web application server 130, web server 125, and optionally database 135 can be combined into a single server computer system. In an alternate embodiment, all or a portion of the web application functions may be integrated into an application running on each of the user computers. For example, a Java™ or JavaScript™ application on the user computer is used to retrieve or analyze data and display portions of the data analysis application.

Computer readable storage media and machine-readable storage media for containing code, or portions of code, executable by computers user computers 105, 110 and 115 and servers 125 and 130 can include any appropriate media known or used in the art, such as but not limited to volatile/non-volatile and removable/non-removable media. Examples of computer-readable storage media include RAM, ROM, EEPROM, flash memory, CD-ROM, digital versatile disk (DVD) or other optical storage, magnetic cassettes, magnetic tape, magnetic disk storage or other magnetic storage devices, or any other medium that can be used to store data and/or program code and that can be accessed by a computer.

Figure 2:
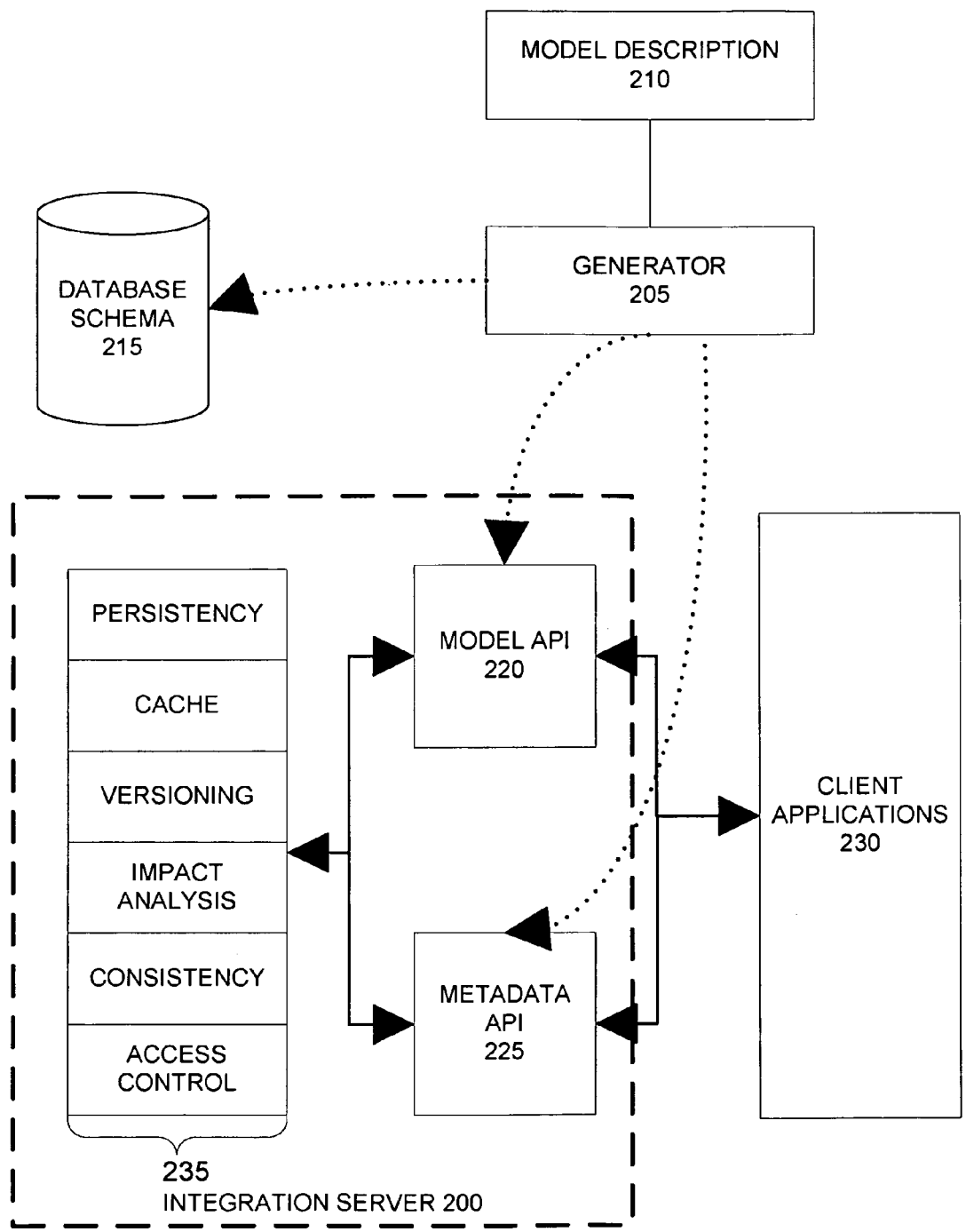
FIG. 2 is a block diagram of an integration server according to an embodiment of the invention.

FIG. 2 is a block diagram of an integration server 200 according to an embodiment of the invention. The integration server 200 provides applications an interface to perform complex data modeling and storage operations. A model generator 205 accesses a model description 210 defining one or more data objects. In an embodiment, the model description 210 uses the Unified Modeling Language™ (UML) to define data objects. UML is an industry-standard language for specifying, visualizing, constructing, and documenting data objects.

In response to the model description 210, the model generator 205 creates a database schema 215, a model application programming interface (API) 220, and model metadata. The database schema 215 is adapted to store instances of the data objects defined by the model description 210 in a database. In an embodiment, the database schema 215 includes one or more database tables adapted to be implemented in a relational database system. In a further embodiment, each database table corresponds to a class of data objects. For an inheritance hierarchy of classes, a single table is created to encompass all classes in the hierarchy.

The model API 220 enables client applications 230 to create instances of the data objects and to store, read, or modify the attributes of the data objects. The model API 220, in conjunction with the rest of the integration server 200, automatically handles the conversion of data objects from their format as stored in the database schema 215 into a format used by the client applications 230. Because client applications 230 may use data objects in a variety of different formats, the integration server 200 is also capable of converting data objects between different formats specific to two or more client applications.

In an embodiment, the model API 220 creates a direct representation of the data objects defined by the model description. Client applications written in an object orientated programming language, such as Java™, can access the data objects in the same manner as any other object in the programming language. In a further embodiment, the model API 220 includes a set of functions or methods corresponding to the attributes of the data objects defined by the model description 210. These "accessor" functions or methods enable client applications to read or set attributes of instances of the data objects. The model API creates the appropriate database commands to perform the desired operation on the data object instance in the database schema 215. In addition, as data object attributes may be defined according to a specific data type, these accessor methods provide a strongly-typed interface to client applications 230, ensuring that only appropriate data types are used.

Figure 8:
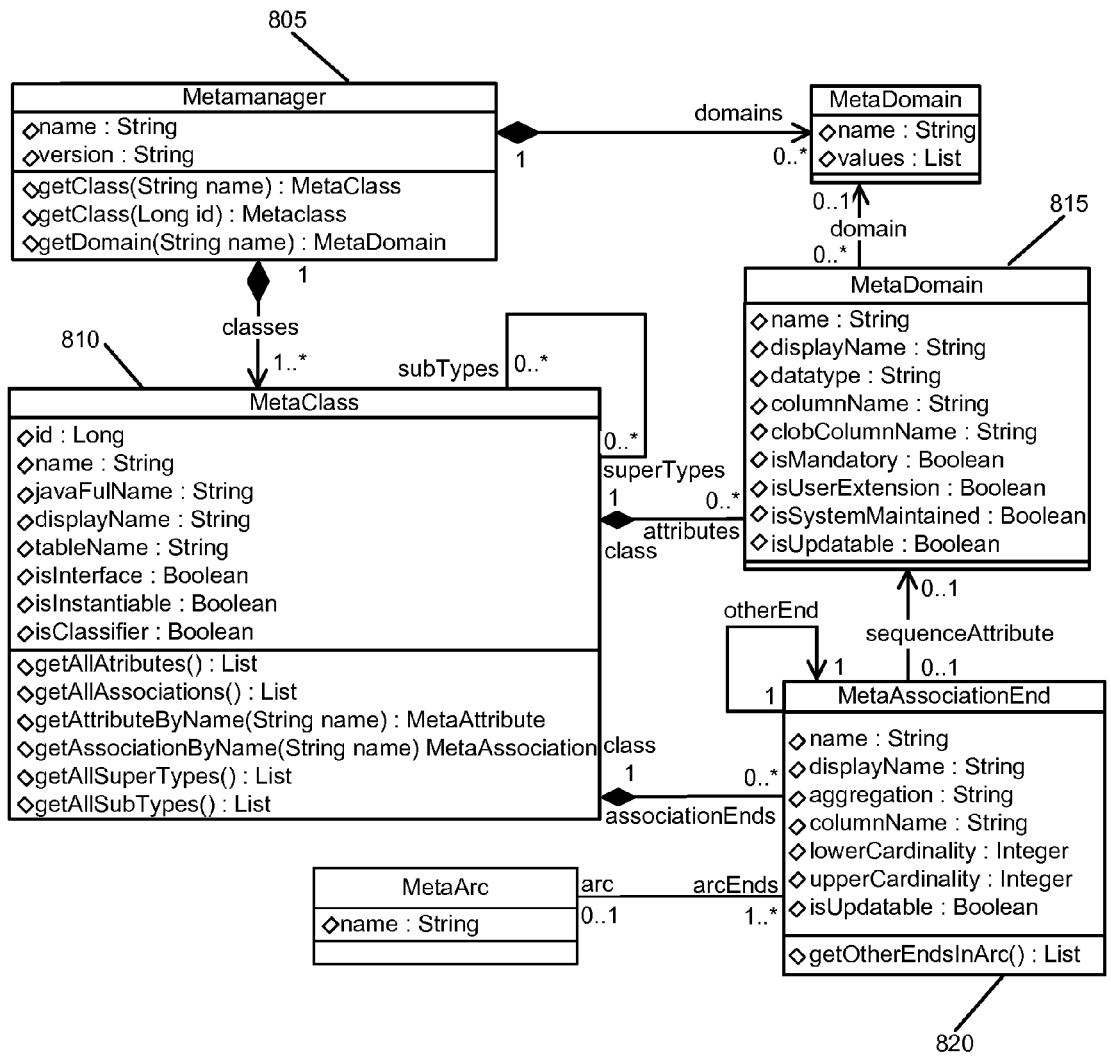
FIG. 8 illustrates a metadata model enabling persistency services and generic user access for data objects according to an embodiment of the invention.

In addition to the model API 220, the generator 205 generates metadata describing the data objects and its corresponding database schema 215. FIG. 8 illustrates an example metadata model 800 enabling persistency services and generic user access for data objects according to an embodiment of the invention. The metadata model is accessed by client applications 230 via metadata API 225. Unlike the model API 220, which enables client applications to access instances of data objects as separate objects, the metadata API 225 enables client applications 230 to access definitions of data objects directly within the database schema 215. Additionally, client applications can create and update objects generically, i.e. without using the model API generated for the object, by using the metadata API 225 to specify one or more pairs of attribute names and their corresponding values. For example, a client application can specify that the attribute "name" should have a value of "Fred" by calling a generic metadata API function "setProperty" with the parameters "(name, Fred)". In a further embodiment, the model API 220 internally translates each of its object-specific method calls into a generic metadata API method call with the appropriate set of attribute name and value parameters.

The metadata model 800 includes a MetaManager 805, a MetaClass 810, a MetaAttribute 815, and a MetaAssociationEnd 820. In an embodiment, there is an instance of the MetaClass 810 for every class of data objects defined by the model description 210. Client applications 230 can use the metadata API 225 to access both attributes of data objects and their associated metadata. For example, the metadata API 225 includes the method "getAllAttributes( )," which retrieves a list of all attributes for a given class. In addition, the metadata API 225 can access the MetaClass 810 attribute "tableName" to get the name of the database table containing the class of data objects in the database schema 215. Similarly, there is an instance of the MetaAttribute 815 for each of the attributes of a data object. Client applications 230 can use the metadata API 225 to access both individual attributes of data objects and their associated metadata. For example, the MetaAttribute 815 has an attribute "columnName" identifying the column of a database table containing the attribute of a data object.

In a further embodiment, the metadata is stored both statically within the metadata model 800 and within the database schema 215. Storing metadata in the metadata model 800 improves performance by reducing the number of database accesses. Storing metadata redundantly in the database schema enables metadata to be accessed outside of the metadata API 225, for example through database commands in PL/SQL.

The integration server includes additional modules 235 to enable operations of persistency, caching, versioning, consistency, access control, and impact analysis.

In yet another embodiment, the additional modules 235 are used to instantiate, or create instances of, data objects in the database schema. In this embodiment, client applications 230 request the creation of one or more new data objects via the model API. The model API communicates this request with the additional modules 235, which in turn creates the instance of the data object in the database schema 215. The additional modules 235 also returns a reference to the data object instance to the requesting client application, which enables the client application to access the data object instance. This embodiment allows the integration server 200 to change database schemas 215, persistency service implementations, or even generators 205 without changing the model API, thereby reducing the need to recompile and/or modify client applications 230 for different database schemas, and persistency service and generator implementations.

Data objects can be associated with one or more other data objects. For example, an instance of a "Purchase Agreement" object may be associated with two or more instances of "Trading Partner" objects representing the parties to the agreement. The database schema stores the associations between data objects. In an embodiment, each association is an attribute of a data object represented by a column of a table in the database schema. Each instance of a data object is assigned an ID number in the database schema. The ID number of a first instance of a data object is stored in the association column, also referred to as a foreign key column, of a second instance of a data object to define an association between two data objects.

For example, FIG. 3 illustrates a table of transformation mappings 305. Each transformation mapping specifies how to convert data objects from one format to another. Example table 305 includes two transformation mappings, entitled "MAP 1" and "MAP 2." In order to convert data objects between different formats, each transformation mapping has at least one and typically many transformation rules. In the example of FIG. 3, transformation rules are stored in a transformation rule table 310. In this embodiment, all of the transformation rules are stored in the same table, regardless of the transformation mapping they belong to.

In table 310, each transformation rule includes a foreign key attribute stored in the "MAP_ID" column. The foreign key attribute identifies the transformation mapping associated with each transformation rule. For example, transformation rules 1, 2, and 3 are associated with transformation mapping "MAP 1," and transformation rule 4 is associated with transformation map "MAP 2."

For some types of data objects, it is necessary to preserve the order of associations. For example, transformation rules typically need to be executed in a specific order to properly convert data objects between formats. Typically, database systems retrieve data in the order it is read from disk, which does not preserve association order.

In one embodiment, association order is done by utilizing an additional sequence attribute column that contains a numeric value corresponding to the association position. When the association is queried from the database, the resulting data can be sorted by the sequence attribute to construct a list with data in the proper order.

As the associations of a data object are manipulated, for example by adding new data objects, removing old data objects, or reordering data objects, the values of the sequence attribute must be computed. Although this is trivial when objects are added to the beginning or end of the sequence, it is difficult and time-consuming for data objects in the middle of a sequence. One prior solution requires that the sequence attributes for the entire sequence by recomputed when data objects within a sequence are changed. This requires a large number of database updates, which decreases performance.

FIG. 3 is an example database schema illustrating an optimized insertion sequence according to an embodiment of the invention. In this embodiment, data objects added to the end of the sequence are assigned a sequence value equal to the sequence value of an adjacent data object plus an increment value. Similarly, data objects added to the beginning of the sequence are assigned a sequence value equal to the sequence value of an adjacent data object minus an increment value. The increment and decrement values are varied by a random factor to allow for concurrent additions to the association by one or more client applications. As discussed in detail below, this enables the data objects to be returned in the same order they are written when they are read back from the database schema.

For a new data object inserted within a sequence between two preexisting data objects, the new sequence value equals the average of the adjacent sequence values plus or minus a random portion of the difference between the adjacent sequence values. The use of a random number in determining the sequence value enables two different applications to manipulate the same association at the same time and to add different data objects to the sequence. In this embodiment, it should be noted that sequence values can be positive or negative floating point numbers. This enables data objects to be added within a sequence without resorting the entire sequence up to the limits of numerical precision used by the floating point numbers. It should also be noted that this embodiment of the invention can be applied to data objects of any type in which association order must be preserved.

When data objects are read back from the database schema, they are sorted according to their sequence values. This ensures that the ordering of associations is always consistent.

For example, if rule 5 of table 310 is to be associated between rules 2 and 3, a sequence value for rule 5 is determined to be twenty-five, the average of the adjacent sequence values, plus 0.8, a random portion of the interval between rules 2 and 3, resulting in a sequence value of 25.8. In order to retrieve the rules of transformation mapping "MAP 1" in the correct order, a database query such as "select * from TRules, where map_ID=1, order by map_seq" can be used.

In a typical prior database schema implementations, strings of characters, referred to as strings, can be stored in an array of characters of a predetermined and fixed length, or in a variable length array or other data structure, such as a database CLOB data structure. Although variable length data structures offer flexibility in being able to handle strings of arbitrary length, they often suffer from slow performance. Fixed length arrays can be accessed quickly, but cannot accommodate strings longer than the size of the array.

Figure 4:
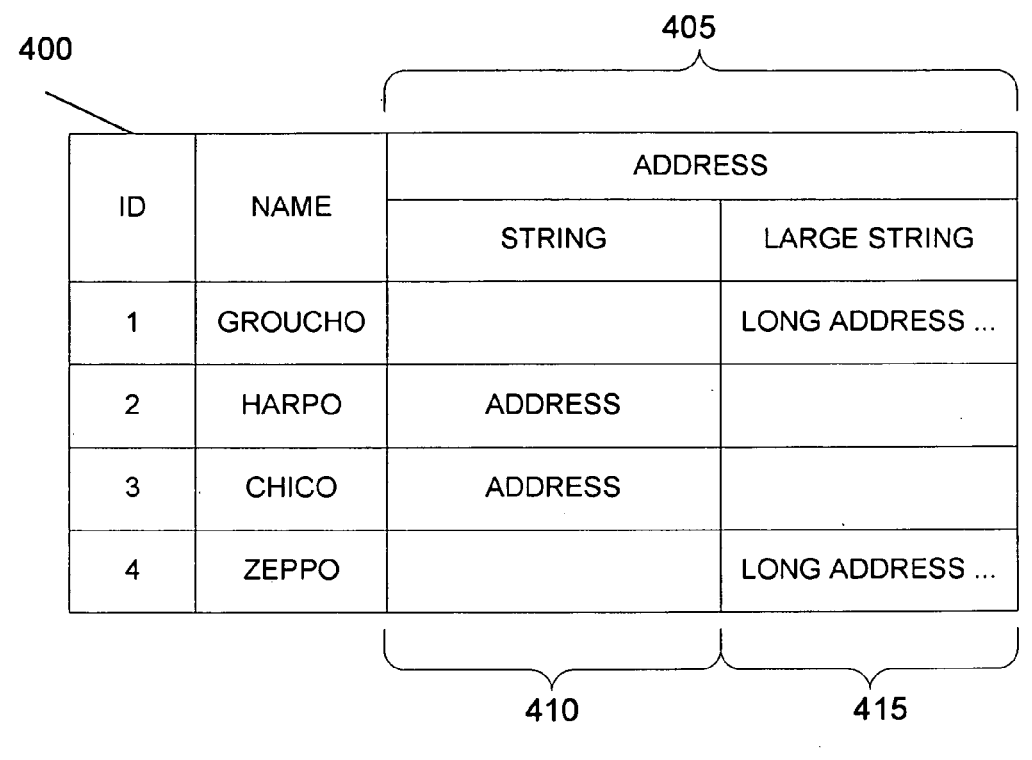

FIG. 4 is an example database schema 400 illustrating an optimized string storage according to an embodiment of the invention. In this embodiment, a string-valued attribute of a data object is alternately stored in one of two different columns depending upon the length of the attribute value. For example, attribute 405 represents an "Address" attribute associated with a set of data objects. Column 410 is associated with the attribute 405 and is adapted to store attribute values in fixed-length character arrays. Column 415 is also associated with attribute 405 and is adapted to store attribute values in variable length data structure, such as a clob. The value of instances of the attribute 405 are stored in the string column 410 if the length of the attribute value is less than the maximum length of the character array, or alternatively in the large string column 415 if the length of the attribute value is greater than the maximum length of the character array. By minimizing the use of variable length data structures to only instances of attribute values in which the extra length is needed, the overall performance of the integration server is improved.

In an embodiment, the model API associated with the integration server automatically assigns attribute values to the appropriate column of the database schema. For example, upon receiving a new or updated attribute value from a client application, the model API determines the length of the attribute value and issues a database command to store the attribute value in the appropriate column associated with the attribute. In a further embodiment, the generator automatically creates the string and a variable length data structure columns in the database schema for each string-valued attribute defined by the model description. Additionally, the generator also creates the corresponding model API methods for assigning attribute values to the appropriate column of the database schema.

In a further embodiment, when an attribute is stored in column 410 in a fixed length data structure, the corresponding location in column 415 associated with a variable length data structure is set to a null value, and vice-versa. This ensures that only one attribute value is stored for each attribute. Additionally, when reading an attribute value from the database schema, the values of both columns 410 and 415 are read, and the non-null value is then returned as the attribute value. If the values of both columns 410 and 415 are both null values, then a null string is returned as the attribute value.

Figures 5A, 5B:
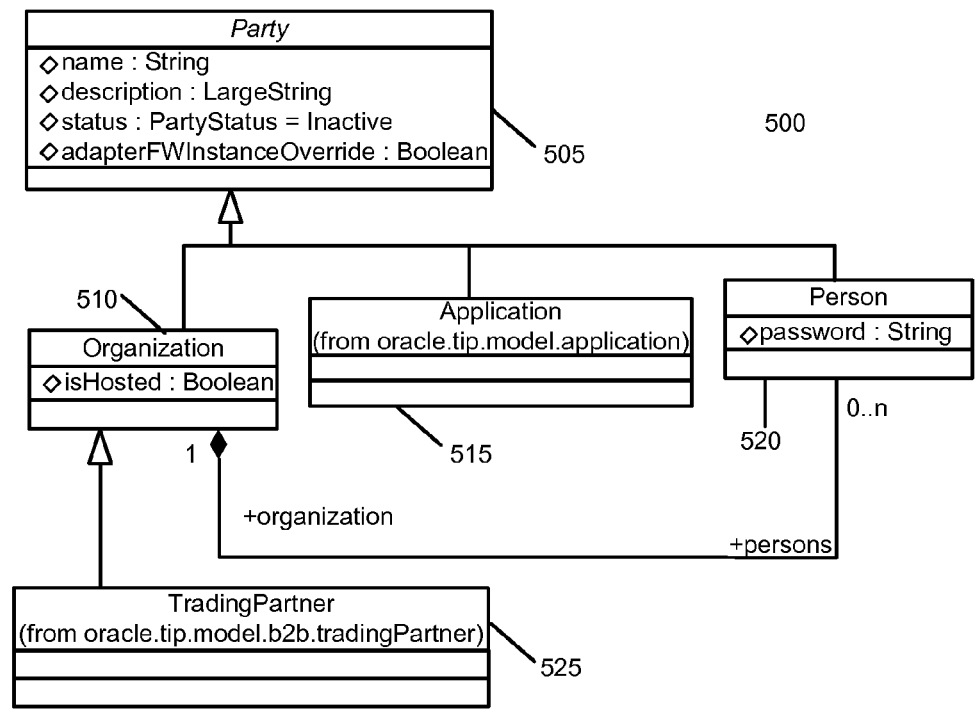
FIGS. 5A and 5B illustrate an example object hierarchy and a corresponding database schema implemented using database constraints according to an embodiment of the invention.

As discussed above, the model description can define a hierarchy of related data objects. In an embodiment, a hierarchy is implemented in the database schema as a single table with a set of database constraints to ensure each data object has a set of valid attributes. FIGS. 5A and 5B illustrate an example object hierarchy and a corresponding database schema implemented using database constraints according to an embodiment of the invention.

In example data object hierarchy 500, Party 505 is a super class. Data objects Organization 510, Application 515, and Person 520 are subclasses of Party 505. Trading Partner 525 is subclass of Organization 510. An embodiment of a database schema implementing this hierarchy 500 includes a single table 530 for implementing all of the data objects of the hierarchy 500. Because all of the data objects in hierarchy 500 are stored in a single table 530 in this example database schema, table 530 includes columns for all of the attributes of all of the data objects in the hierarchy 500.

Different data objects, depending upon their relationship in the hierarchy 500, may only include a portion of the total set of attributes. For example, data objects 510, 515, and 520 all inherit the "name" and "description" attributes from party data object 505. However, only data object 520 includes the "password" attribute. Database constraints are used to ensure that each instance of a data object has only the proper attributes. For example, the "name" and "description" columns 535 are used for all data objects in the hierarchy 500. In contrast, the "password" column 545 is only used for instances of "person" objects. In an embodiment, the database constraints use the contents of a "Class Type" column 540 added by the generator to distinguish different object types stored in the table 530 and to apply the appropriate constraints associated with that object type.

In an embodiment, the generator creates a single table for the class hierarchy. The generator creates a column name for each attribute. A "class type" column is also created to differentiate the data objects.

Attributes and associations can be classified as mandatory or optional for each class and subclass. For mandatory attributes, a "NOT NULL" database constraint should be generated for mandatory attributes. For example in hierarchy 500, attribute "name" is mandatory for "party" 505 and the association between "Organization" 510 and "person" 520 is mandatory for the person class. As "party" 505 is a super class, all subclasses will inherit the mandatory "name" attribute. Thus, the "name" attribute should be associated with a "NOT NULL" database constraint for all classes. Similarly, the "password" attribute should be associated with a "NOT NULL" database constraint only for instances where the "Class Type" column has a value of person. Table 1 illustrates example source code used by the generator to create table 530 with the appropriate database constraints.

TABLE 1

Example Table with Database Constraints

```
create table party (
    name navarchar2(100) NOT NULL,
    organization ROW(16),
    classtype NUMBER(10)
        CONSTRAINT tip_part_ck CHECK(classtype in(1,2,3,4,5)),
    notm NUMBER(10) DEFAULT 1 NOT NULL,
    CONSTRAINT tip_person_ck CHECK (classtype != 4 OR
        (classtype == 4 AND ORGANIZATION IS NOT NULL))
```

The following pseudo-code illustrates an example algorithm for generating "NOT NULL" database constraints and "XOR" or "Arc" database constraints, discussed below, according to an embodiment of the invention.

TABLE 2

Example Algorithm for Generating Database Constraints

```
createConstraint{
    if(attribute is mandatory){
        if(superClass || no subclasses) {
            add column constraint
        }else {
            append this constraint to existing table constraint
            if (subClasses exist) {
                add this constraint to all sub classes
            }
        }
    }
    if(association is mandatory){
        if(superClass || !arcExists) {
            add column constraint
        }else {
            if(arcExists) {
                create arc constraint
                    e.g. assoc1 and assoc2 are in arc the constraint should
                    be
                        (assoc1 is NULL AND assoc2 is NOT NULL) OR
                        (assoc1 is NOT NULL AND assoc2 is NULL)
            }else {
                create regular not null table constraint
            }
            append this constraint to existing table constraint
            if (subClasses exist) {
                add this constraint to all sub classes
            }
        }
    }
}
```

Figure 6:
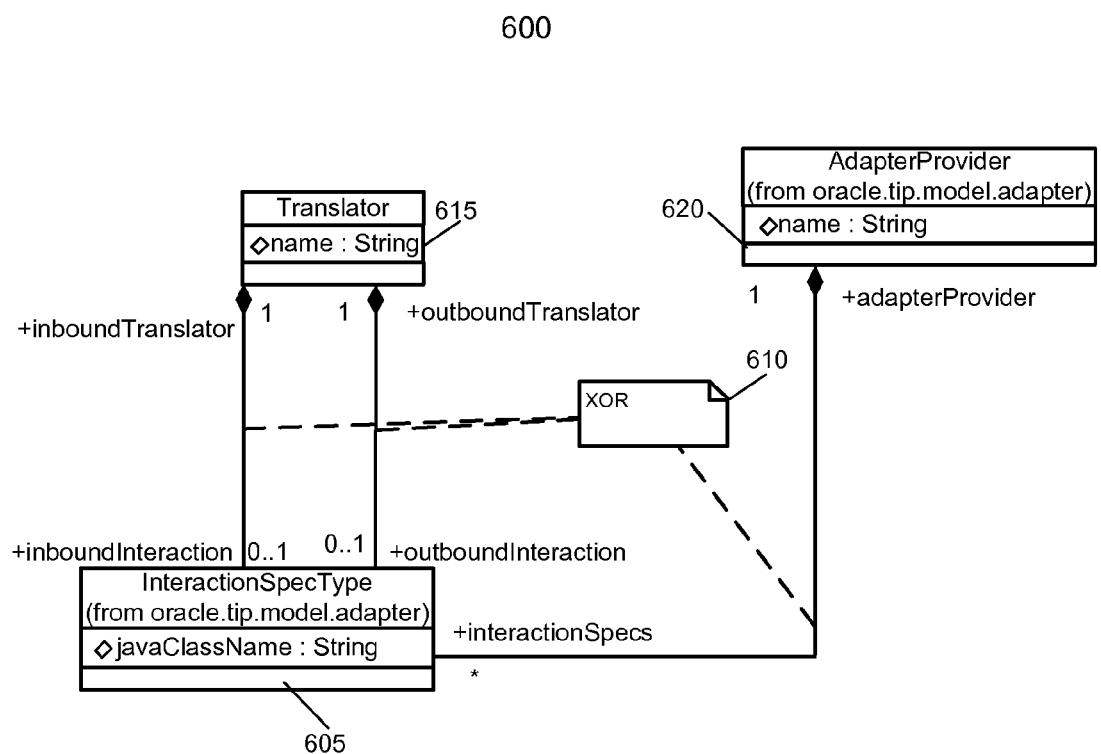
FIG. 6 illustrates an example object hierarchy to be implemented using database constraints according to an embodiment of the invention.

Database constraints can be used to implement a variety of conditions on a database schema. In addition to ensuring that mandatory attributes are provided, constraints can ensure that attribute values fall within a predetermined valid range or that associations with other data objects, either within the same table or a separate table, have valid foreign key values. In a further embodiment, database constraints can ensure that only one of a pair of mutually exclusive attributes has a value in each instance of a data object. FIG. 6 illustrates an example object hierarchy 600 to be implemented using database constraints according to an embodiment of the invention. In example hierarchy 600, the InteractionSpecType 605 can be associated with either translator 615, via either inboundTranslator or outboundTranslator, or adapter provider 620, via interactionSpecs, as indicated by XOR operator 610. Table 3 illustrates example code implementing a database schema enforcing this constraint.

TABLE 3

Example Code Implementing Database Constraints

```
create table interactionspectype (
    javaclassName navarchar2(100) NOT NULL,
    adapterprovider RAW(16),
    inboundTranslator RAW(16),
    outboundTranslator RAW(16),
    classtype NUMBER(10)
        CONSTRAINT tip_interactionspectype_ck
    CHECK(classtype in(10)),
        notm NUMBER(10) DEFAULT 1 NOT NULL,
        CONSTRAINT tip_person_ck CHECK (
            (classtype == 10 AND(
                (inboundTranslator is NOT NULL AND
                outboundTranslator is NULL OR
                adapterProvider is NULL) OR
                (inboundTranslator is NULL AND
                outboundTranslator is NOT NULL OR
                adapterProvider is NULL) OR
                (inboundTranslator is NULL AND
                outboundTranslator is NULL OR
                adapterProvider is NOT NULL))
        ));
```

In a further aspect of the invention, updating one end of an association between two data objects automatically updates the data object at the other end of the association. For example, if a "Department" data object adds an association to an "Employee" data object, the "Employee" data object should automatically be updated with association back to the "Department" data object. To achieve this, data classes include additional "WithoutBalance" accessors methods. Upon updating one end of an association, the "WithoutBalance" accessor method of the data object at the other end of the association is invoked.

The WithoutBalance method updates the association on just one end of the association, as opposed to a regular accessor method that updates both ends of the association by calling WithoutBalance methods. In the latter case, the accessor methods would each end up calling update methods on their counterparts, resulting in an infinite loop.

As discussed above, database constraints are used to ensure that valid attribute values are stored in the database schema. In an embodiment, the database constraints are immediate constraints, which are checked immediately as an instance is written, rather than at the end of a complete database transaction. Immediate constraints have the advantage of generating an error immediately when an instance is written, enabling applications to easily trace the source of the error. However, using immediate constraints requires that data object instances be written in a specific order to ensure that the foreign key constraints are not violated for valid data. For example, parent data objects must be written prior to their child data objects to ensure that the child objects reference valid foreign keys for their parent associations.

Table 4 illustrates example pseudo-code for an algorithm used to ensure proper write-through order according to an embodiment of the invention.

TABLE 4

Pseudo-code for Example Write-Through Algorithm

```
sub processEntry(dirtyList, writeList, entry)
    // non dirty instance
    if entry.state = 'QUERIED' then
        return
```

TABLE 4-continued

Pseudo-code for Example Write-Through Algorithm

```
     end if
     for each child association name
         dependent = entry.getAssociation("child association")
         // if dependent instance not already in ordered list then add
         // parents depth first recursively
         if not writeList.contains(dependent) then
             processEntry(dirtyList, writeList, dependent)
         end if
         add object to end of list
         writeList.add(entry)
end sub
List dirtyList = get list of modified objects from transaction
List writeList = new List( )
// build up list of root nodes
for each entry in dirtyList
    if entry has no dirty child (stored) associations then
        writeList.add(entry)
    end if
end for
if writeList.size = 0 then
// no root nodes thus circular instance association
// throw exception as cannot produce write thru order
    throw Exception
end if
// add child instances for each entry in list
for each entry in writeList
    for each parent association name
        List childrenList = entry.getAssociationList("parent
        association")
        for each child in childrenList
            // child should not already be in list before parent
            // throw exception as can't resolve circular reference
            if writeList.subset(1, entry.pos 1).contains(child) then
                throw Exception
            end if
            //add entry and its dependents to writeList
            processEntry(dirtyList, writeList, child)
        end for
    end for
end for
```

Figure 7:
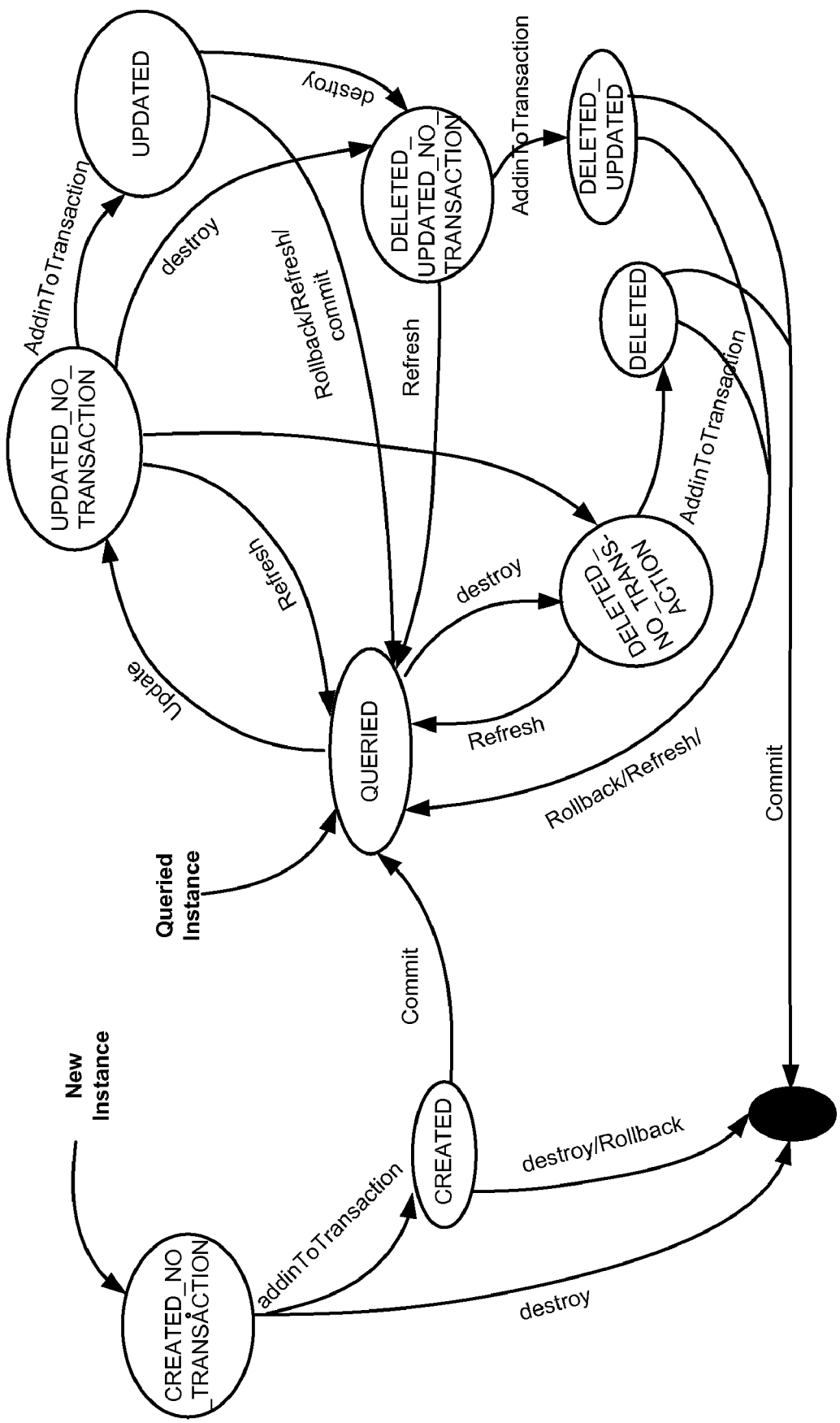
FIG. 7 illustrates a state diagram for storing data objects in a database according to an embodiment of the invention.

As shown with the algorithm of table 4, data objects can have a number of different states, such as queried, created, updated, and deleted. FIG. 7 illustrates a state diagram for storing data objects in a database according to an embodiment of the invention. The state diagram of FIG. 7 determines whether an object needs to be updated or stored in the database according to the state associated with the object. Additionally, the model API can create and store temporary data objects. Temporary data objects can be used to collect and store data from applications in stages. Once data collection has been completed, the temporary data objects can be converted into permanent data objects and stored in the database schema.

This invention provides a system for mapping data objects on a relational database schema that offers a strongly-typed model API, complex constraint management, and association balancing. The system also has improved performance through optimized handling of ordered associations of data object and of string-valued attributes. Although the invention has been discussed with respect to specific examples and embodiments thereof, these are merely illustrative, and not restrictive, of the invention. Thus, the scope of the invention is to be determined solely by the claims.

What is claimed is:

1. An integration server system that enables data modeling and storage operations of data objects, the system comprising:
    a processor operable to execute instructions stored in a data storage medium;
    a database operable to store data accessible to the processor;
    a model generator adapted to create a database schema including one or more database tables in response to a model description defining one or more data objects, wherein the database schema is configured to store a set of data object instances in the database, and wherein the model generator is adapted to create object structures having one-to-one and one-to-many mappings; and
    an application programming interface operable to enable a client application to create instances of a data object in the database schema and provide the client application with access to the set of data object instances as separate data objects enabling the client application to perform the data modeling and storage operations of data objects.

2. The integration server system of claim 1 wherein the object structures having one-to-one and one-to-many mappings created by the generator are accessible by client applications.

3. The integration server system of claim 2 wherein the object structures having one-to-one and one-to-many mappings created by the generator comprise meta data describing data objects and corresponding database schema.

4. The integration server system of claim 1 further comprising a module to enable caching.

5. The integration server system of claim 1 wherein the model generator is capable of creating a single table to encompass all classes in an inheritance hierarchy of classes.

6. The integration server system of claim 1 further comprising a module adapted to automatically assign attribute values to columns in the database.

7. The integration server system of claim 6 wherein the module adapted to automatically assign attribute values to columns in the database is part of the application programming interface.

8. The integration server system of claim 1 further comprising a module that creates a set of functions corresponding to attributes of data objects defined by the model description including accessor functions that enable client applications to read or set attributes of instances of the data objects.

9. The integration server system of claim 8 wherein the module that creates the set of functions corresponding to attributes of data objects defined by the model description including accessor functions that enable client applications to read or set attributes of instances of the data objects is part of the application programming interface.

10. The integration server system of claim 1 wherein the model generator allows mapping of attributes that are not specifically defined in the class definition.

11. The integration server system of claim 1 wherein the model generator is further adapted to create model metadata.

12. The integration server system of claim 11 wherein metadata is stored both statically within the meta data model and within the database schema.

13. The integration server system of claim 1 wherein the model generator is adapted to create the application programming interface.

14. The integration server system of claim 1 wherein the application programming interface includes an accessor function which allows a client application to read or set attributes of instances of data objects by generating an appropriate database command.

15. The integration server system of claim 1 wherein data objects can be associated with one or more other data objects and the associations between data objects is stored in the database, each association being an attribute of a data object represented by a column of a table in the database schema.

16. The integration server system of claim 15 wherein each instance of a data object is assigned an ID number in the database schema and the ID number of a first instance of a data object is stored in the association column of a second instance of a data object to define an association between two data objects.

17. The integration server system of claim 1 wherein the database comprises a table of transformation mappings where each mapping specifies how to convert data objects from one format to another.

18. An integration server system that enables data modeling and storage operations of data objects, the system comprising:
- a processor operable to execute instructions stored in a data storage medium;
- a relational database operable to store data accessible to the processor that updates and retrieves data in response to SQL commands;
- a model generator adapted to create a database schema including one or more database tables in response to a model description defining one or more data objects, wherein the database schema is configured to store a set of data object instances in the database and wherein the model generator is further adapted to create object structures having one-to-one and one-to-many mappings and is capable of creating a single table to encompass all classes in an inheritance hierarchy of classes;
- an application programming interface operable to enable a client application to create instances of a data object in the database schema and provide the client application with access to the set of data object instances as separate data objects enabling the client application to perform the data modeling and storage operations of data objects, wherein the application programming interface allows client applications written in an object oriented programming language to access the data objects in the same manner as any other object in the programming language; and
- a module that creates a set of functions corresponding to attributes of data objects defined by the model description including accessor functions that enable client applications to read or set attributes of instances of the data objects.

19. The integration server system of claim 18 wherein, in response to a request for creation of one or more new data objects from a client application, the application programming interface coordinates a response to the request including creating an instance of the data object in the database schema and returning a reference to the data object instance to the requesting client application thereby allowing the integration server to change database schemas without changing the model application programming interface.

20. The integration server system of claim 19 wherein data objects can be associated with one or more other data objects in the model description and wherein the associations between data objects are stored in the database, each association being an attribute of a data object represented by a column of a table in the database schema and wherein each instance of a data object is assigned an ID number in the database table, wherein the ID number of a first instance of a database object is stored in an association column of a second instance of a data object to define an association between two data objects.

21. The integration server system of claim 20 wherein variable length strings can be stored in the database schema in a manner that provides improved performance as compared to storing the variable length strings in a Character Large Object ("CLOB") data structure.

22. The integration server system of claim 20 wherein the integration server is capable of converting data objects between different formats specific to two or more client applications.

23. The integration server system of claim 22 further comprising a module to enable caching.

24. The integration server system of claim 22 further comprising a module adapted to automatically assign attribute values to columns in the database.

25. The integration server system of claim 22 wherein the model generator allows mapping of attributes that are not specifically defined in the class definition.

26. The integration server system of claim 22 wherein metadata is stored both statically within the meta data model and within the database schema.

27. The integration server system of claim 18 wherein the application programming interface includes an accessor function which allows a client application to read or set attributes of instances of data objects by generating an appropriate database command.

28. The integration server system of claim 18 wherein data objects can be associated with one or more other data objects and the associations between data objects is stored in the database, each association being an attribute of a data object represented by a column of a table in the database schema.

29. The integration server system of claim 28 wherein each instance of a data object is assigned an ID number in the database schema and the ID number of a first instance of a data object is stored in the association column of a second instance of a data object to define an association between two data objects.

30. The integration server system of claim 18 wherein the database comprises a table of transformation mappings where each mapping specifies how to convert data objects from one format to another.

31. An integration server system that enables data modeling and storage operations of data objects, the system comprising:
- a processor operable to execute instructions stored in a data storage medium;
- a relational database operable to store data accessible to the processor that updates and retrieves data in response to SQL commands;
- a model generator adapted to create a database schema in response to a model description defining one or more data objects, the database schema including one or more database tables configured to store a set of data object instances in the database, wherein the model generator allows mapping of attributes that are not specifically defined in the class definition, is capable of creating a single table to encompass all classes in the hierarchy and object structures having one-to-one and one-to-many mappings;
- an application programming interface operable to enable a client application to create instances of a data object in the database schema and provide the client application with access to the set of data object instances as separate data objects enabling the client application to perform the data modeling and storage operations of data objects, wherein the application programming interface allows client applications written in an object oriented programming language to access the data objects in the same manner as any other object in the programming language, and wherein in response to a request for creation of one or more new data objects from a client application the application programming interface coordinates a response to the request including creating an instance of the data object in the database schema and returning a reference to the data object instance to the requesting client application thereby allowing the integration server to change database schemas without changing the model application programming interface; and one or more modules that (i) create a set of functions corresponding to attributes of data objects defined by the model description including accessor functions that enable client applications to read or set attributes of instances of the data objects; (ii) enable caching; and automatically assign attribute values to columns in the database; and wherein the integration server is capable of converting data objects between different formats specific to two or more client applications based on transformation rules stored in a table of the database and automatically handling conversion of data objects from their format as stored in the database schema into a format used by the client application; and storing variable length strings in the database schema in a manner that provides improved performance as compared to storing the variable length strings in a Character Large Object ("CLOB") data structure.

32. The integration server system of claim 31 wherein data objects can be associated with one or more other data objects in the model description and wherein the associations between data objects are stored in the database, each association being an attribute of a data object represented by a column of a table in the database schema and wherein each instance of a data object is assigned an ID number in the database table, wherein the ID number of a first instance of a database object is stored in an association column of a second instance of a data object to define an association between two data objects.

33. A method of enabling a client application executing on a computer to perform operations on data objects defined by a model description stored in a machine-readable medium along with a database schema including one or more database tables configured to store a set of data object instances in a database created from the model description and a model application programming interface from the model description that enables the client application to access data objects in the set of data object instances in the same manner as other data objects, the method comprising:

using the model application programming interface to create instance of data objects in the database schema including an instance of an object structure having one-to-one and one-to-many mappings;

storing the created data object instances in a machine-readable medium;

accessing the created data object instances as a separate data objects with the client application; and performing operations on the accessed data object instances including storing, reading and modifying attributes of the data objects.

34. The method of claim 33 wherein the instances of object structures having one-to-one and one-to-many mappings comprise meta data describing data objects and corresponding database schema.

35. The method of claim 34 further comprising reading or setting attributes of instances of data objects with an accessor function by generating an appropriate database command.

36. The method of claim 33 further comprising creating a single table to encompass all classes in an inheritance hierarchy of classes.

37. The method of claim 33 further comprising automatically assigning attribute values to columns in the database.

38. The method of claim 33 further comprising creating a set of functions corresponding to attributes of data objects defined by the model description including accessor functions that enable client applications to read or set attributes of instances of the data objects.

39. The method of claim 33 wherein a module is provided to enable caching.

40. The method of claim 33 further comprising mapping attributes that are not specifically defined in the class definition.

41. The method of claim 33 further comprising ordering retrieved data by a value of an attribute of the data.

42. The method of claim 33 further comprising generating a persistent unique sequence value for data objects stored in the database.

43. The method of claim 33 wherein a module is provided to enable caching and wherein the method further comprises:

creating a single table to encompass all classes in an inheritance hierarchy of classes;

assigning attribute values to columns in the database;

creating a set of functions corresponding to attributes of data objects defined by the model description including accessor functions that enable client applications to read or set attributes of instances of the data objects; and mapping attributes that are not specifically defined in the class definition.

44. The method of claim 43 further comprising requesting creation of one or more new data objects and receiving a response to the request including an instance of the data object created in the database schema and a reference to the data object instance.

45. A method of enabling a client application executing on a computer to perform operations on data objects defined by a model description stored in a machine-readable medium, the method comprising:

creating and storing in a machine-readable medium a database schema including one or more database tables configured to store a set of data object instances in a database from the model description including a single table to encompass all classes in an inheritance hierarchy of classes;

creating and storing in a machine-readable medium a model application programming interface from the model description that enables the client application to access data objects in the set of data object instances in the same manner as other data objects;

assigning attribute values to columns in the database and mapping attributes that are not specifically defined in the class definition;

creating a set of functions corresponding to attributes of data objects defined by the model description including accessor functions that enable client applications to read or set attributes of instances of the data objects by generating an appropriate database command;

ordering retrieved data by a value of an attribute of the data;

generating a persistent unique sequence value for data objects stored in the database;

creating instances of data objects in the database schema using the model application programming interface including an instance of an object structure having one-to-one and one-to-many mappings;

storing the created data object instances in a machine-readable medium;

accessing the created data object instances as a separate data objects with the client application; and performing operations on the accessed data object instances including storing, reading and modifying attributes of the data objects.

46. A computer-readable medium for a computer system, the computer-readable medium having stored thereon a model description defining one or more data objects, a database schema including one or more database tables configured to store a set of data object instances in a database created from the model description, a model application programming interface created from the model description that enables the client application to access data objects in the set of data object instances in the same manner as other data objects, and a series of instructions which, when executed by a processing component of the computer system, cause the processing component to:

create instance of data objects in the database schema using the model application programming interface including an instance of an object structure having one-to-one and one-to-many mappings;

store the created data object instances in the computer-readable medium;

access the created data object instances as a separate data objects with the client application; and perform operations on the accessed data object instances including storing, reading and modifying attributes of the data object.

47. The computer-readable medium of claim 46 wherein the instances of object structures having one-to-one and one-to-many mappings stored in the computer-readable medium comprise meta data describing data objects and corresponding database schema.

48. The computer-readable medium of claim 46 wherein the model description includes an inheritance hierarchy of classes and the series of instructions further causes the processing component to create a single table to encompass all classes in an inheritance hierarchy of classes.

49. The computer-readable medium of claim 46 wherein the series of instructions further causes the processing component to automatically assign attribute values to columns in the database.

50. The computer-readable medium of claim 46 wherein the series of instructions further causes the processing component to create a set of functions corresponding to attributes of data objects defined by the model description including accessor functions that enable client applications to read or set attributes of instances of the data objects.

51. The computer-readable medium of claim 46 wherein a module is provided to enable caching.

52. The computer-readable medium of claim 46 wherein the series of instructions further causes the processing component to map attributes that are not specifically defined in the class definition.

53. The computer-readable medium of claim 46 wherein the series of instructions further causes the processing component to read or set attributes of instances of data objects with an accessor function by generating an appropriate database command.

54. The computer-readable medium of claim 46 wherein the series of instructions further causes the processing component to order retrieved data by a value of an attribute of the data.

55. The computer-readable medium of claim 46 wherein the series of instructions further causes the processing component to generate a persistent unique sequence value for data objects stored in the database.

56. The computer-readable medium of claim 46 wherein the model description includes an inheritance hierarchy of classes and wherein the series of instructions further causes the processing component to:

create a single table to encompass all classes in an inheritance hierarchy of classes;

assign attribute values to columns in the database;

create a set of functions corresponding to attributes of data objects defined by the model description including accessor functions that enable client applications to read or set attributes of instances of the data objects; and map attributes that are not specifically defined in the class definition.

57. The computer-readable medium of claim 46 further wherein the series of instructions further causes the processing component to request creation of one or more new data objects and receive a response to the request including an instance of the data object created in the database schema and a reference to the data object instance.

58. A computer-readable medium for a computer system, the computer-readable medium having stored thereon a model description defining one or more data objects and a series of instructions which, when executed by a processing component of the computer system, cause the processing component to:

create and store in a computer-readable medium a database schema including one or more database tables configured to store a set of data object instances in a database from the model description including a single table to encompass all classes in an inheritance hierarchy of classes;

create and store in a computer-readable medium a model application programming interface from the model description that enables the client application to access data objects in the set of data object instances in the same manner as other data objects;

assign attribute values to columns in the database and mapping attributes that are not specifically defined in the class definition;

create a set of functions corresponding to attributes of data objects defined by the model description including accessor functions that enable client applications to read or set attributes of instances of the data objects by generating an appropriate database command;

order retrieved data by a value of an attribute of the data;

generate a persistent unique sequence value for data objects stored in the database;

create instances of data objects in the database schema using the model application programming interface including an instance of an object structure having one-to-one and one-to-many mappings;

store the created data object instances in a computer-readable medium;

access the created data object instances as a separate data objects with the client application; and perform operations on the accessed data object instances including storing, reading and modifying attributes of the data objects.

* * * * *

UNITED STATES PATENT AND TRADEMARK OFFICE
CERTIFICATE OF CORRECTION

| | | |
|---|---|---|
| PATENT NO. | : 8,145,685 B2 | Page 1 of 1 |
| APPLICATION NO. | : 12/192898 | |
| DATED | : March 27, 2012 | |
| INVENTOR(S) | : Thompson et al. | |

It is certified that error appears in the above-identified patent and that said Letters Patent is hereby corrected as shown below:

On page 2, in column 1, under "Other Publications", line 8, delete "Retireved" and insert -- Retrieved --, therefor.

On sheet 8 of 8, in figure 8, Box. 810, line 4, delete "javaFulName" and insert -- javaFullName --, therefor.

On sheet 8 of 8, in figure 8, Box. 810, line 10, delete "getAllAtributes()" and insert -- getAllAttributes() --, therefor.

In column 4, line 11, after "by" delete "computers".

In column 15, line 2, in Claim 31, after "application" insert -- , --.

In column 18, line 18, in Claim 57, after "46" delete "further".

Signed and Sealed this
Ninth Day of October, 2012

David J. Kappos
*Director of the United States Patent and Trademark Office*